United States Patent [19]

Kumagai

[11] 4,413,701
[45] Nov. 8, 1983

[54] TRANSMISSION WITH OFFSET DIFFERENTIAL AND DEEP WIDE GROOVE RADIAL BALL BEARING SUPPORTING INTERMEDIATE SHAFT

[75] Inventor: Tadanobu Kumagai, Toyota, Japan

[73] Assignee: Toyota Jidosha Kabushiki Kaisha, Toyota, Japan

[21] Appl. No.: 325,195

[22] Filed: Nov. 27, 1981

[30] Foreign Application Priority Data

Dec. 25, 1980 [JP] Japan .......................... 55-186867[U]

[51] Int. Cl.³ .............................................. B60K 17/30
[52] U.S. Cl. .................................. 180/256; 180/70 P; 180/297; 308/188
[58] Field of Search ...................... 180/55, 70 R, 70 P, 180/73 R, 233, 234, 247, 248, 249, 250, 252, 180, 253, 254, 256, 297; 308/188

[56] References Cited

U.S. PATENT DOCUMENTS 2,782,864 2/1957 Fessia .................................. 180/256
4,334,721 6/1982 Satoh et al. .......................... 308/188

Primary Examiner—Joseph F. Peters, Jr.
Assistant Examiner—Kenneth R. Rice

Attorney, Agent, or Firm—Stevens, Davis, Miller & Mosher

[57] ABSTRACT

A transmission includes two drive shafts of equal length, each flexibly drivingly coupled at its outer end to a driven wheel; a differential axially located closer to a first one of the wheels and further from the other, which has a first power output shaft extending towards the first wheel which is flexibly drivingly coupled at its outer end to the inner end of the one of the drive shafts whose outer end is drivingly connected to the first wheel, and a second power output shaft extending towards the other wheel; an intermediate shaft, flexibly drivingly coupled at its inner end to the outer end of the second power output shaft, and flexibly drivingly coupled at its outer end to the inner end of the one of the drive shafts whose outer end is drivingly connected to the other wheel; a bracket, mounted at one end to a fixed member; and a deep groove radial ball bearing. The outer race of the ball bearing is fixedly mounted to the other end of the bracket, and the inner race of the ball bearing supports an outer part of the intermediate shaft and is fixedly mounted to it. The radius of the cross section of the inner race groove is approximately 0.52 times the diameter of the ball bearing balls, while the radius of the cross section of the outer race groove is approximately 0.60 times the diameter of the balls.

5 Claims, 6 Drawing Figures

FIG. 5
FIG. 6
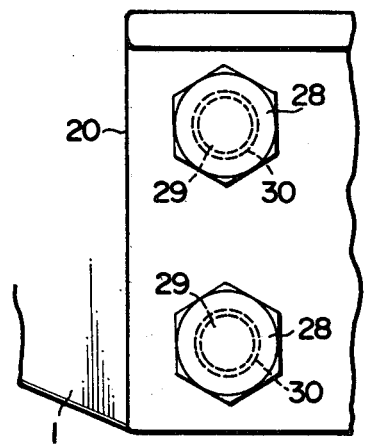
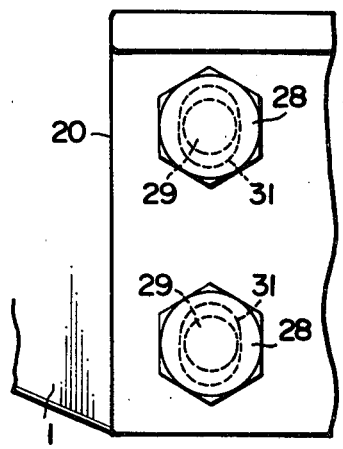

TRANSMISSION WITH OFFSET DIFFERENTIAL AND DEEP WIDE GROOVE RADIAL BALL BEARING SUPPORTING INTERMEDIATE SHAFT

BACKGROUND OF THE INVENTION

The present invention relates to a power transmission device for a vehicle, and, more particularly, relates to a power transmission device for a vehicle with two axially opposed driven wheels, in which a differential is provided between these driven wheels and is axially located closer to one of these wheels and further from the other of them—i.e. in an asymmetrical location relative to the wheels.

In the case of a vehicle provided with a transversely mounted engine, especially in the case of a vehicle of the front engine front wheel drive type or the so called FF type, it is very common for the differential device which transmits power from the gearbox of the vehicle to the driven wheels thereof, and which provides differential action between said driven wheels, to be displaced to one side or to the other side of the longitudinal axis of the vehicle, i.e. for this differential device to be closer to one of the driven wheels and farther from the other of the driven wheels. This is because of the limited space available in the engine compartment of such a vehicle, due to the transverse mounting of the engine therein, and to the relative alignment of the various units in the power train of the vehicle, and is a well known matter in the automotive art.

The question then arises as to how the rotary power is to be transmitted from such an asymmetrically positioned differential to these driven wheels of the vehicle. If the differential is provided with left and right power output shafts which are of the same length, and if the end of each of these power output shafts is connected to its respective driven wheel by a drive shaft and by universal joints, then, since the left and the right drive shafts will necessarily be of different lengths, these drive shafts will incline downwards at different angles, and will be connected to the driven wheels through different angles. When the drive shaft is inclined downward at an angle, it exerts during acceleration of its rotation such a moment on the driven wheel as will steer the driven wheel inward according to the amount of the angle of downward inclination. This means that during acceleration of the driven wheels, and also, when the driven wheels are the front wheels of the vehicle and are also used for steering the vehicle, the difference in the angles of downward inclination of the left and the right drive shafts will cause asymmetrical acceleration and steering characteristics for the vehicle, so that a tendency will arise for the vehicle, during acceleration, to steer towards the side on which the drive shaft is longer. This deteriorates straight ahead drivability of the vehicle, and accordingly is quite unacceptable.

In view of the above described problem, a constructional solution has been proposed for a power transmission with such an asymmetrically located differential, in which the left and right drive shafts are of equal lengths, and incline downwards at the same angles, and on the side of the vehicle on which the distance between the differential and the driven wheel is the shorter the inner end of the drive shaft is directly connected to the outer end of the power output shaft of the differential by a universal joint, while on the side of the vehicle on which the distance between the differential and the driven wheel is the greater the inner end of the drive shaft is connected by a universal joint to the outer end of an intermediate shaft, the inner end of which is connected, possibly by another universal joint, to the outer end of the power output shaft of the differential on that side. In this case, the outer end remote from the differential of this intermediate shaft is often required to be supported, via at least one bearing, by some fixe member of the vehicle such as the engine thereof.

In such a construction, the angles down through which the left and the right drive shafts incline are the same, and accordingly the left and right driven wheels are provided with equal steering torques, accordingly eliminating asymmetrical steering and driving characteristics of the vehicle; on the other hand, it is important to make the support rigidity provided by the aforesaid support bearing which supports the outer end remote from the differential of the intermediate shaft rather high. Now in this case it would be ideal if the central axis of this support bearing could be aligned, during the fixing of the support bearing to the member by which it is supported such as the engine of the vehicle, so as to be coincident with the axis of the output shaft of the differential on that side; but in practice, due to the inevitable effects of manufacturing tolerances and errors, this is not possible, and an offset between these two axes, as well as non parallelism thereof, always occurs during manufacture and assembly.

Because, therefore, it is very difficult to align the central axis of the support bearing with the central axis of the output shaft of the differential on that side, the problem arises that high stresses are set up during assembly and are maintained during vehicle operation, both on the components of the support bearing and on the components of the differential. In particular, an offset load on the support bearing means that the operating life thereof will be significantly reduced. Especially if this support bearing is a radial ball bearing of a conventional sort, if it is fitted with significant displacement present between its central axis and the central axis of the output shaft of the differential on that side, the inclination thereby caused of the axis of the intermediate shaft relative to the central axis of the outer race of the support bearing means that the inner race of said support bearing will be forced to be inclined with respect to the outer race, and this will make the life of the support bearing rather short. Thus, the reliability of the transmission as a whole will be decreased.

SUMMARY OF THE INVENTION

Accordingly, it is an object of the present invention to provide a power transmission of a general construction such as described above, in which the differential is asymmetrically placed between the driven wheels of a vehicle to which the transmission is mounted, in which the drive shafts which drive the driven wheels of the vehicle are of equal length and angle downwards through the same angles, and in which the power output shaft of the differential on its side closer to a driven wheel is directly connected to the drive shaft which drives that wheel, while the power output shaft of the differential on its side farther from a driven wheel is connected to the inner end of an intermediate shaft whose outer end is connected to the drive shaft which drives that wheel, in which said intermediate shaft is supported near its said outer end from a fixed member of the vehicle incorporating said transmission by a support bearing of a construction which is well adapted to withstand offset and misalignment between its central axis and the central axis of said intermediate shaft.

It is a further object of the present invention to provide such a transmission as described above, in which said support bearing is adapted to have a long service life.

It is a further object of the present invention to provide such a transmission as described above, in which the service life of said support bearing is not significantly deteriorated by offset between its axis and the power output axis of the differential on its side.

It is a further object of the present invention to provide such a transmission as described above, in which stress between the inner and the outer races of such a support bearing, caused due to offset between the axis of said support bearing and the power output axis of the differential on its side, is not unduly great.

It is a further object of the present invention to provide such a transmission as described above, in which the tendency for the balls of the support bearing to come out of the grooves in the inner or the outer race thereof, caused due to offset between the axis of said support bearing and the power output axis of the differential on its side, is not unduly great.

It is a further object of the present invention to provide such a transmission as described above, in which no particularly difficult adjustment during assembly of the transmission is required.

It is a further object of the present invention to provide such a transmission as described above, in which manufacturing complexity is not significantly increased.

It is a yet further object of the present invention to provide such a transmission as described above, in which no unreasonably high dimensional accuracy is required for the various parts thereof during manufacture.

It is a yet further object of the present invention to provide such a transmission as described above, in which a degree of adjustability of the fixing of said support bearing to said fixed member of the vehicle is available.

According to the present invention, these and other objects are accomplished by, in a vehicle comprising a fixed member and two axially opposed driven wheels, a transmission comprising: (a) two drive shafts of equal length, each flexibly drivingly coupled at its outer end to one of said wheels; (b) a differential axially located closer to a first one of said wheels and farther from the other one of said wheels, comprising: (b1) a first power output shaft extending towards said first wheel and flexibly drivingly coupled at its outer end to the inner end of the one of said drive shafts whose outer end is drivingly connected to said first wheel; and (b2) a second power output shaft extending towards said other wheel; (c) an intermediate shaft, flexibly drivingly coupled at its inner end to the outer end of said second power output shaft, and flexibly drivingly coupled at its outer end to the inner end of the other of said drive shafts whose outer end is drivingly connected to said other wheel; (d) a bracket, mounted at its one end to said fixed member; and (e) a deep groove radial ball bearing comprising an inner race formed with a inner race groove, an outer race formed with an outer race groove, and a plurality of balls of substantially equal diameters running in said inner race groove and in said outer race groove; said outer race being fixedly mounted to the other end of said bracket, and said inner race supporting an outer part of said intermediate shaft and being fixedly mounted thereto; the cross sections of said inner race groove and of said outer race groove being approximately part circular; and the radius of said cross section of said inner race groove being approximately 0.52 times the diameter of said balls, while the radius of said cross section of said outer race groove is approximately 0.60 times the diameter of said balls.

By this construction, in which the relatively large radiuses of the grooves in the inner race and the outer race of the ball bearing allow much more angular movement between said inner race and said outer race than is conventional, thereby offset between the position of the axis of the outer race of the bearing (i.e. the position of the hole in the bracket which supports it) and the axis of that power output shaft of the differential which is connected to the intermediate shaft may be allowed for, and does not cause any substantial problem in practice with regard to undue stress placed on the components of the bearing such as between the balls and the grooves thereof, or with regard to the balls coming out of the grooves; and thus it is practicable to form the two drive shafts which extend to the driven wheels to be of equal lengths, and to provide such an intermediate shaft supported in such a way, to compensate for the fact that the differential is axially offset towards said first one of said driven wheels, thus providing good operational characteristics for said vehicle and preventing asymmetrical driving of said vehicle.

Further, according to a particular constructional specialization of the present invention, it is possible to mount said bracket to said fixed member at its said one end with some adjustability.

This allows some coarse positioning of the bearing to be performed during assembly of the transmission and of the vehicle incorporating it, and is a very useful additional feature with regard to minimizing stress on the bearing components.

According to yet more particular constructional specializations of the present invention, this adjustability may be provided by bolting the bracket to said fixed member by bolts which pass through holes in the bracket which are larger than said bolts; and these holes may further be formed as substantially circular holes, or may be formed as slots.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

FIG. 5 is an enlarged view of part of FIG. 2 showing the engagement of a bolt and a bolt hole formed in a bracket; and FIG. 6 is a view similar to FIG. 5, showing another possibility of the shape of the bolt hole.

DESCRIPTION OF THE PREFERRED EMBODIMENT

The present invention will now be described in terms of the preferred embodiment thereof, and with respect to the accompanying drawings.

Figure 1:
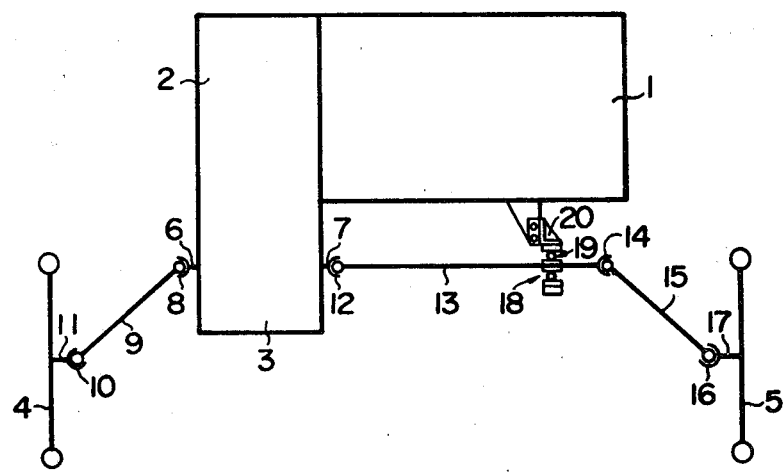
FIG. 1 is a schematic illustration, showing generally the construction of the preferred embodiment of the transmission according to the present invention, in part block diagrammatical form.
Figure 2:
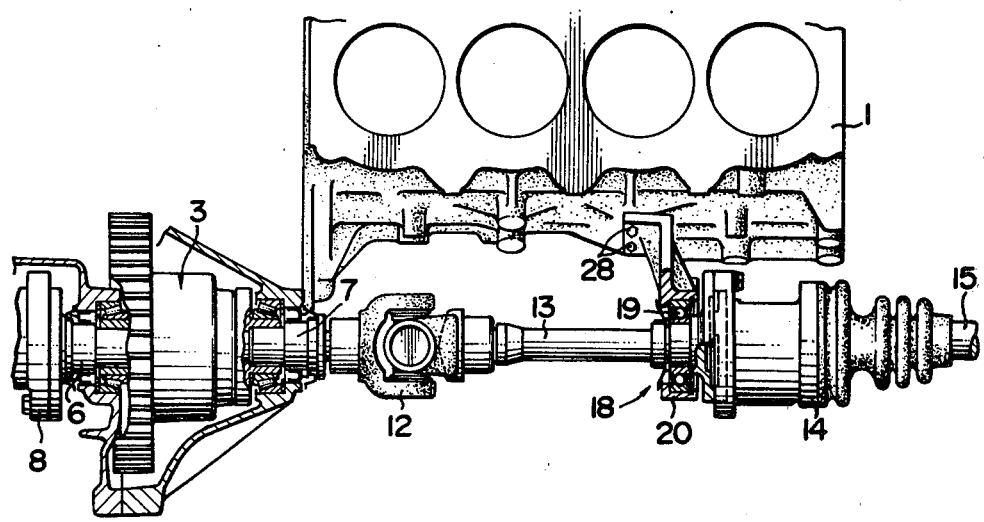
FIG. 2 is a part sectional part plan view of part of said preferred embodiment of the transmission according to the present invention, showing in part section a differential casing and the members contained therein and the power output shafts of this differential, showing an intermediate shaft coupled at its inner end by a universal joint to one of these differential power output shafts and supported at its outer end by a support bearing construction, and also showing universal joints coupled to the outer ends of this intermediate shaft and of the other power output shaft of the differential, and part of a drive shaft extending outwards from one of these universal joints.

In FIG. 1, there is shown in schematic form the general construction of the preferred embodiment of the transmission according to the present invention. Referring to this figure, the reference numeral 1 denotes the transversely mounted engine of a vehicle, which transmits rotary power to a gearbox 2 fitted on to one side of said engine 1. The longitudinal axis of the vehicle runs perpendicular to the plane of the drawing paper in FIG. 1. Below the gearbox 2, and integral therewith, there is provided a differential device 3. To the left and to the right of the engine 1 and the gearbox 2, and somewhat below them, there are positioned left and right vehicle wheels 4 and 5, and accordingly it will be seen that the engine 1 and the gearbox 2 are transversely mounted above and between these left and right vehicle wheels 4 and 5. In fact, in the shown construction, the wheels 4 and 5 are the front wheels of the vehicle, and are steered, and accordingly this vehicle is of a transverse front engined front wheel drive type, i.e. a so called FF type.

The left hand vehicle wheel 4 is driven by a short stub axle 11 fitted on the inner side thereof, and, similarly, the right hand vehicle wheel 5 is driven by a short stub axle 17 mounted on the inner side thereof. These stub axles 11 and 17 are of equal lengths.

To the inner end of the left hand stub axle 11 there is coupled, via a constant velocity universal joint 10, the outer end of a left hand drive shaft 9 for driving the left hand vehicle wheel 4. Similarly, to the inner end of the right hand stub axle 17 there is coupled, via a constant velocity universal joint 16, the outer end of a right hand drive shaft 15 for driving the right hand vehicle wheel 5. These drive shafts 9 and 15 are of equal lengths.

From the differential 3 there extend a left hand power output shaft 6 and a right hand power output shaft 7. The outer end of the left hand power output shaft 6 is coupled, via constant velocity universal joint 8, to the inner end of the left hand drive shaft 9, and the outer end of the right hand power output shaft 7 is coupled, via a cross type universal joint 12, to the inner end of an intermediate shaft 13, the outer end of which is coupled, via a constant velocity universal joint 14, to the inner end of the right hand drive shaft 15. According to this construction, the length of the intermediate shaft 13 compensates for the asymmetrical positioning of the differential 3 with respect to the driven wheels 4 and 5, so that according to this construction, as mentioned above, the left hand drive shaft 9 is of the same length as the right hand drive shaft 15, and the left and right hand drive shafts 9 and 15 extend downwards at the same down slope angles.

Figure 3:
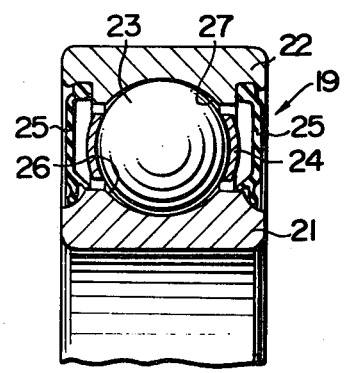
FIG. 3 is a partial sectional view of said support bearing, showing its components in more detail, and is an enlarged view of part of FIG. 2.

Particularly according to the present invention, a right hand portion of the intermediate shaft 13 extending to the right of the differential 3, i.e. an outer portion of said intermediate shaft 13 remote from the differential 3, is supported by a support device 18 of a particular sort. This support device 18 comprises a deep groove radial ball bearing 19 and a bracket 20 which supports this ball bearing 19. As may best be seen in FIG. 3, the ball bearing 19 comprises an outer race 22 within which is formed a circular groove 27, a plurality of balls 23 running in this circular groove 27, a ball cage 24 which maintains the relative alignment of the balls 23, an inner race 21 formed with a circular groove 26 within which the balls 23 run, and two seal elements 25 which retain lubricant within the ball bearing 19 and around the balls 23. The outer race 22 of the ball bearing 19 is fitted in one end of the support bracket 20, so as to be rigidly supported thereby, and the outer end portion of the intermediate shaft 13 is fitted in the inner race 21 of the ball bearing 19, also so as to be rigidly supported thereby. Bolt holes not particularly shown in the figures are provided in the end of the bracket 20 remote from the ball bearing 19, and a plurality of bolts 28 fix this end of the bracket 20 to the internal combustion engine 1. Accordingly, therefore, by the rigidity of the parts, the outer or right hand end of the intermediate shaft 13 is well rotatably supported, with respect to the internal combustion engine 1 and therefore with respect to the differential 3 which is fixed with respect to said engine 1, and is not able to lash about from side to side.

In fact, in the shown embodiment, the bolt holes 30 in the bracket 20 are formed to be circular holes somewhat larger than the shanks 29 of the bolts 28, so as to allow of a certain degree of adjustability during the process of mounting the bracket 20 to the internal combustion engine 1, within the limitations imposed by the sizes of these holes. An alternative possible construction would be to form these holes instead as slots, 31 so as to allow of a certain degree of sliding of the bracket 20 with respect to the internal combustion engine 1, before tightening up of the bolts see FIGS. 5 and 6 28.

Figure 4:
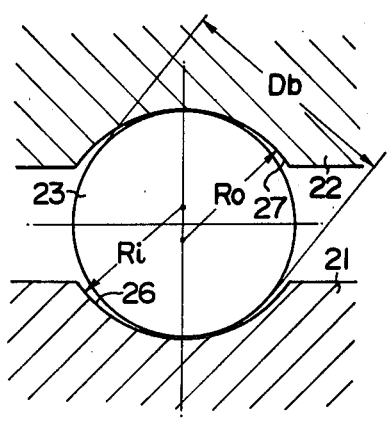
FIG. 4 is a diagrammatic illustration, showing the dimensional constructional principles of said support bearing.

Particularly according to the present invention, the groove 26 and 27 are not formed as in the standard or conventional radial ball bearing, but are of somewhat larger radiuses. As may be seen in FIG. 4, each of these grooves 26 and 27 is formed of substantially part circular cross section, and further, if the diameter of the balls 23 of the ball bearing 19 be taken as Db, then the radius Ri of the groove 26 in the inner ball race 21 is formed to be approximately $0.52 \times Db$, while the radius Ro of the groove 27 in the outer ball race 22 is formed to be approximately $0.60 \times Db$.

This particular construction for the ball bearing 19 means that, because the groove radiuses Ri and Ro in the inner and the outer races 21 and 22 thereof, and especially the groove radius Ro in the outer race, are made larger than those used in a conventional radial ball bearing, therefore if the intermediate shaft 13 becomes—as it inevitably will during construction and assembly—angled at a certain angle with respect to the axis of the outer race 22 of the ball braring 19, i.e. with respect to the axis of the hole in the bracket 20 which receives the ball bearing 19 tightly, then, although naturally thereby inclination between the inner race 21 and the outer race 22 of the ball bearing 19 will occur and the areas of contact between the balls 23 and the grooves 26 and 27 will be forced away from the deepest portions of the grooves 26 and 27 and towards the shoulders of the grooves 26 and 27, nevertheless a greater degree of such inclination will be possible before the balls 23 are forced out of either the groove 26 in the inner race 21 or the groove 27 in the outer race 22. Further, a greater degree of such inclination of the intermediate shaft 13 will be possible before undue stress is caused between the balls 23 and the surfaces of the grooves 26 and 27. In other words, a greater degree of angling of the intermediate shaft 13 is tolerable, before problems arise with respect to the construction and the durability of the ball bearing 19; that is, the tolerance of the ball bearing 19 to wobbling of its inner race is larger than in the conventional case.

Thereby, the tolerance in fitting the intermediate shaft 13 to the transmission and to the vehicle during assembly is larger than it would be if only a conventional ball bearing were used instead of the shown ball bearing 19, and even if the axes of the ball bearing 19 and the intermediate shaft 13 are angled with respect to one another, or in other words the axes of the ball bearing 19 and of the differential power output shaft 7 on that side are displaced from one another, this does not cause a great problem, and does not unduly deteriorate the life of the ball bearing 19. Thus, high dimensional accuracy for the various parts of the transmission during manufacture is not particularly required, according to the shown construction, nor is any particularly difficult adjustment after the manufacturing process and during the assembly of the transmission required, which is a great advantage.

Thus, it is seen that the shown construction allows for the differential 3 to be asymmetrically placed between the driven wheels 4 and 5 of the vehicle, closer to one than to the other, while preserving substantially symmetrical driving characteristics of the vehicle, by allowing the downwardly sloping drive shafts 9 and 15 to be of the same length and to be angled downwards through the same down slope angle.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. In a vehicle comprising a fixed member and two axially opposed driven wheels, a transmission comprising:
    (a) two drive shafts of equal length, each flexibly drivingly coupled at its outer end to one of said wheels;
    (b) a differential axially located closer to a first one of said wheels and farther from the other one of said wheels, comprising: (b1) a first power output shaft extending towards said first wheel and flexibly drivingly coupled at its outer end to the inner end of the one of said drive shafts whose outer end is drivingly connected to said first wheel; and (b2) a second power output shaft extending towards said other wheel;
    (c) an intermediate shaft, flexibly drivingly coupled at its inner end to the outer end of said second power output shaft, and flexibly drivingly coupled at its outer end to the inner end of the other of said drive shafts whose outer end is drivingly connected to said other wheel;
    (d) a bracket, mounted at its one end to said fixed member; and
    (e) a deep groove radial ball bearing comprising an inner race formed with a inner race groove, an outer race formed with an outer race groove, and a plurality of balls of substantially equal diameters running in said inner race groove and in said outer race groove; said outer race being fixedly mounted to the other end of said bracket, and said inner race supporting an outer part of said intermediate shaft and being fixedly mounted thereto; the cross sections of said inner race groove and of said outer race groove being approximately part circular; and the radius of said cross section of said inner race groove being approximately 0.52 times the diameter of said balls, while the radius of said cross section of said outer race groove is approximately 0.60 times the diameter of said balls.

2. A transmission according to claim 1, wherein said bracket is mounted to said fixed member at its said one end with some adjustability.

3. A transmission according to claim 2, further comprising a plurality of bolts, wherein said bracket is formed with a plurality of holes, one of each of said bolts passing through each of said holes and being screwed into said fixed member so as to fix said bracket to said fixed member; wherein said holes are larger than the parts of said bolts which pass through them.

4. A transmission according to claim 3, wherein said holes are formed approximately as circular holes.

5. A transmission according to claim 3, wherein said holes are formed approximately as slots.

* * * * *